United States Patent
Joshi

(10) Patent No.: US 7,398,513 B2
(45) Date of Patent: Jul. 8, 2008

(54) METHOD AND SYSTEM OF DETECTING INVALID FUNCTION CALLS BETWEEN SEGMENTS IN GENERATING A COMPUTER PROGRAM

(75) Inventor: Anand Joshi, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 609 days.

(21) Appl. No.: 10/431,962

(22) Filed: May 8, 2003

(65) Prior Publication Data

US 2004/0225921 A1    Nov. 11, 2004

(51) Int. Cl.
*G06F 9/44* (2006.01)
(52) U.S. Cl. ........................ 717/124; 717/162
(58) Field of Classification Search ................ 717/124; 714/38
See application file for complete search history.

(56) References Cited

U.S. PATENT DOCUMENTS

| | | | | |
|---|---|---|---|---|
| 5,579,520 | A * | 11/1996 | Bennett | 717/151 |
| 6,142,684 | A * | 11/2000 | Kirshenbaum et al. | 717/143 |
| 6,149,318 | A * | 11/2000 | Chase et al. | 717/131 |
| 6,856,953 | B1 * | 2/2005 | Randmaa et al. | 704/200 |
| 7,000,151 | B2 * | 2/2006 | Dwyer | 714/38 |
| 7,086,044 | B2 * | 8/2006 | Hanson et al. | 717/151 |
| 2003/0046673 | A1 * | 3/2003 | Copeland et al. | 717/163 |
| 2004/0143824 | A1 * | 7/2004 | Sarcar | 717/145 |

OTHER PUBLICATIONS

Community.borland.com, Technical Information Database, Article #15961 Coping with Fixup Overflow messages, http://vmlinux.org/~jakov/community.borland.com/15961.html,[retrieved on Sep. 25, 2007] pp. 1-4.*
Paul R.Wilson, Some Issues and Strategies in Heap Management and Memory Hierarchies, ACM SIGPLAN Notices, vol. 26, No. 3, Mar. 1991 (pp. 45-52).*

* cited by examiner

*Primary Examiner*—Tuan Dam
*Assistant Examiner*—Chrystine Pham
(74) *Attorney, Agent, or Firm*—Hope Baldauff Hartman, LLC

(57) ABSTRACT

A method and system are provided for detecting invalid function calls between segments during the generation of a computer program. A source file and a fixup source file are created for a program file. The source file defines segments in the program file. The fixup source file defines the segments defined in the source file to be a predetermined size. Next, the program file, the source file, and the fixup source file are assembled to create a program object, a source object, and a fixup object. A source library and a fixup library are created from the source object and the fixup object. The program object is linked with the fixup library to generate a dummy output file. During the generation of the dummy output file, a determination is made as to whether an invalid function call is made between the plurality of segments defined in the fixup library. If it is determined that an invalid function call is made between the segments defined in the fixup library, then an error is reported in the dummy output file. If it is determined that no invalid function calls are made between the segments in the dummy output file, then the dummy output file is ignored and the source library is linked with the program file to generate an actual output file.

19 Claims, 5 Drawing Sheets

US 7,398,513 B2

METHOD AND SYSTEM OF DETECTING INVALID FUNCTION CALLS BETWEEN SEGMENTS IN GENERATING A COMPUTER PROGRAM

TECHNICAL FIELD

The present invention is related to computer system configuration. More particularly, the present invention is related to detecting invalid function calls between segments in the generation of a computer program.

BACKGROUND OF THE INVENTION

Computer programs are made up of a series of statements or instructions which when executed, cause a computer to behave in a predetermined manner. When a computer program is compiled, the source instructions are compiled or linked into machine language instructions which can then be executed by a processor in the computer. Generally, the instructions and associated data in a computer program are stored in the computer as a file which is then copied into a main memory or Random Access Memory ("RAM") in the computer where it is executed.

Many modern computer programs are written so that program code is divided into distinct parts which are copied to segments in the RAM memory of the computer. For example, program instructions may be in one segment while program data may be in another segment. Program instructions or functions in one segment may be "called" by program code in the same segment or in a different segment to perform specific tasks. Programs are written so that "calls" to program functions in the same segment are defined as "near" calls while inter-segment calls (i.e., calls between segments) to functions are defined as "far" calls.

The only valid way to call inter-segment functions is to use "far" calls. As a result, programs containing near calls to functions in different segments generate a fixup overflow error when linked and may cause the program to malfunction when the program is executed. In the case of some computer system programs, such as a basic/input output system ("BIOS") program, such a malfunction may be catastrophic as a computer system needs valid BIOS code to boot the computer as well as to perform other important tasks.

Current methods for detecting fixup overflow errors utilize an assembler program which is used to convert source program code to object program code. Then, a linker program is used to convert the object program code into an executable program. When a program is assembled and linked into an executable file by the linker program, the linker checks the validity of each function call defined in the segments of program code based on a default segment size of 64 kilobytes. The linker therefore validates near calls as calls to functions within 64 kilobytes of memory while validating far calls as calls to functions between segments.

There are several problems with the aforementioned current methods for detecting fixup overflow errors. One problem occurs when programmers in writing program code define segments to be less than 64 kilobytes to save space. As a result, an improper near call between two such segments with a combined length of less than 64 kilobytes will cause the assembler program to continue to build the program since the near call is within the same 64 kilobyte boundary which the assembler program processes valid near calls. In response to the near call occurring between segments, the assembler program will generate a generic warning message of a possible error as it continues to successfully build the program. However, as a result of the continuation of the build process, the warning message often goes undetected resulting in a build which may be unusable due to the invalid function call. Another problem is that although the warning may eventually be found by parsing a message log generated after the program build, finding the error requires debugging the entire program which can be a very time-consuming process.

It is with respect to these considerations and others that the present invention has been made.

SUMMARY OF THE INVENTION

In accordance with the present invention, the above and other problems are solved by methods for detecting invalid function calls between segments during the generation of a computer program. In accordance with other aspects, the present invention relates to a method of detecting invalid function calls between segments contained within a program file executed in a computer system. The program file may contain BIOS code for a computer system.

According to the method, a source file and a fixup source file are created for a program file. The program file includes code for making function calls to functions defined in the program file. The source file defines segments in the program file. Each segment defined in the source file is defined to contain at least one of the functions defined in the program file. The fixup source file defines the segments defined in the source file to be a predetermined size. The predetermined size may be a maximum size allowed for segments in the program file. The predetermined size may also be less than the maximum size allowed for segments in the program file.

The program file, the source file, and the fixup source file are assembled to create a program object, a source object, and a fixup object. A source library and a fixup library are created from the source object and the fixup object. The program object is linked with the fixup library to generate a dummy output file. During the generation of the dummy output file, a determination is made as to whether an invalid function call is made between the plurality of segments defined in the fixup library. If it is determined that an invalid function call is made between the plurality of segments defined in the fixup library, then an error is reported in the dummy output file. The error reported in the dummy output file may be a fixup overflow condition. If it is determined that no invalid function calls are made between the segments in the dummy output file, then the dummy output file is ignored and the source library is linked with the program file to generate an actual output file.

In linking the program object with the fixup library, the fixup library issues a directive to the program object in which the size of each segment in the plurality of segments is increased to the predetermined size. An invalid function call may be determined by checking whether a calling function in the segments defined in the fixup library is making a near call to another function.

In accordance with other aspects, the present invention relates to a system for detecting invalid function calls in a program file. The program file includes code for making function calls to functions defined in the program file. The system includes an application program module for creating a source file. The source file defines segments in the program file which contain the functions defined in the program file. The application program module is also utilized for creating a fixup source file. The fixup source file defines the segments defined in the source file to be a predetermined size. The system further includes an assembler program module. The assembler program module is operative to assemble the program file, the source file, and the fixup source file into a program object, a source object, and a fixup source object. The system further includes a library program module. The library program module is operative to receive the source file and the fixup source file to generate a source library and a fixup source library. Finally, the system includes a linker program module. The linker program module is operative to link the program object and the fixup source library to generate a dummy output file.

During the generation of the dummy output file, the linker program module determines whether an invalid function call is made between the segments defined in the fixup library. If it is determined that an invalid function call is being made, the linker program module reports an error in the dummy output file. If it is determined that no invalid function calls are made between the plurality of segments during the generation of the dummy output file, the linker program module ignores the dummy output file and links the program object with the source library to generate an actual output file.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
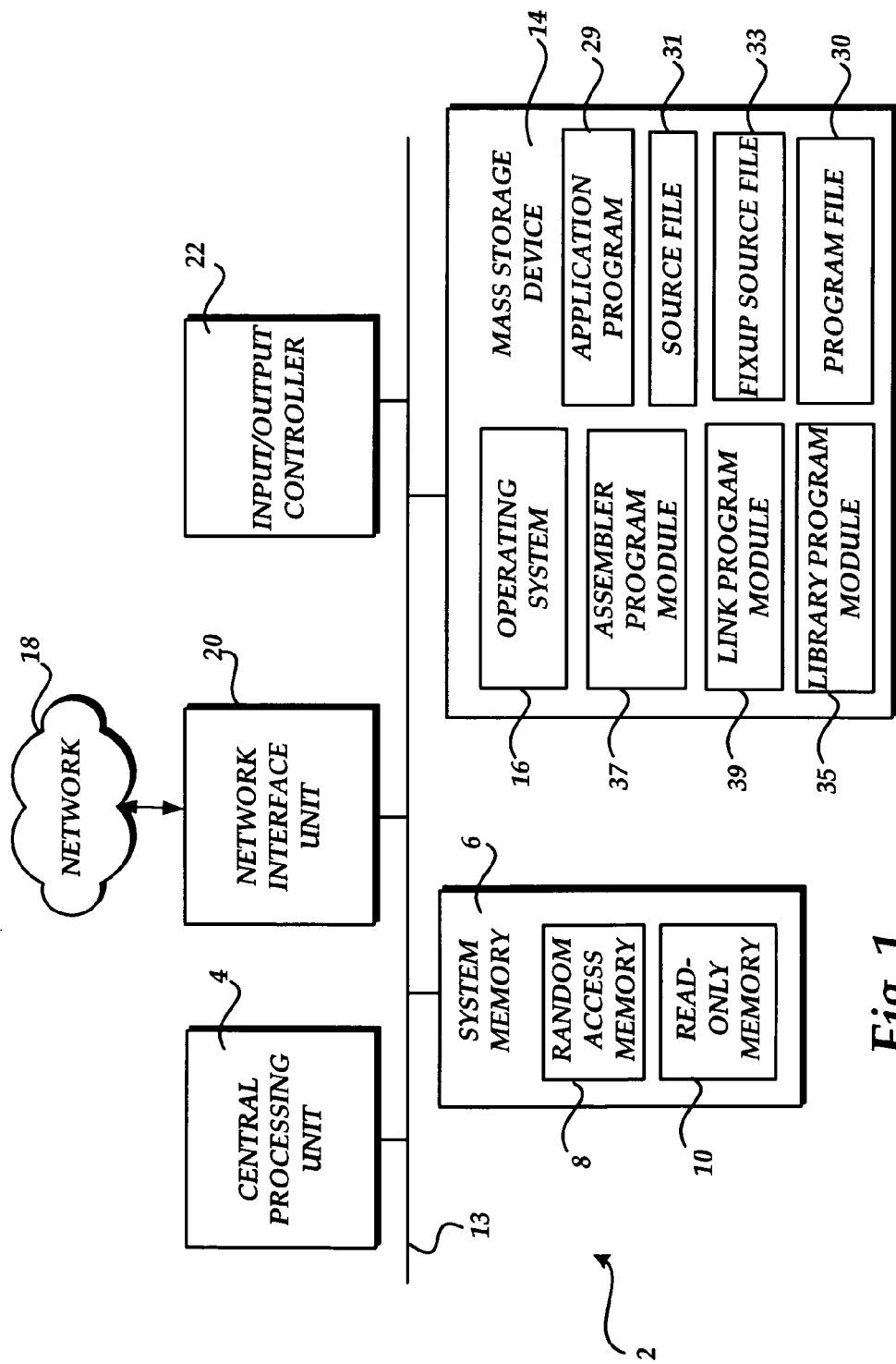
FIG. 1 illustrates a computer system architecture which may be utilized in various embodiments of the invention.

Embodiments of the present invention provide methods for detecting invalid function calls within a computer program. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

FIG. 1 and the following discussion are intended to provide a brief, general description of a suitable computing environment in which the invention may be implemented. While the invention will be described in the general context of program modules that execute in conjunction with an application program that runs on an operating system on a computer system, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a computer system 2 which was discussed briefly above, for practicing the various embodiments of the invention will be described. The computer system 2 comprises a standard local or server computer operative to execute one or more application programs. Alternatively, the computer system 2 may comprise another type of computing device operative to access a network 18, such as a personal digital assistant or other type of computer. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 13 that couples the system memory 6 to the CPU 4. The ROM 10 comprises a memory device for storing a basic input/output system ("BIOS") containing the basic routines that help to transfer information between elements within the computer. These basic routines are accessed to boot the computer as well as to initialize and interface hardware with operating system software.

The computer system 2 further includes a mass storage device 14 for storing an operating system 16, an application program (such as a word processing program) 29, a program file 30, a source file 31, a fixup source file 33, a library program module 35, an assembler program module 37, a linker program module 39, and other application programs (not shown). The application program 29 is used to write program instructions contained in the program file 30, the source file 31, and the fixup source file 33. It will be understood by those skilled in the art that the instructions contained in the program file 30, the source file 31, and the fixup source file 33 may be written in any suitable programming language which may be compiled and assembled for execution by the CPU 4 in the computer system 2. In one embodiment of the invention, the aforementioned files are written in assembly language.

The program instructions in the program file 30 include functions for calling (i.e., calling functions) other functions (i.e., called functions) which are defined in the program file 30. The source file 31 and the fixup source file 33 define individual program instructions in the program file 30 as memory segments which are assigned in the RAM 8 from which the program files are executed. In one embodiment, the program code in the program file 30 may comprise BIOS source code for the computer system 2. The layout of the source file 31 will be described in greater detail with respect to FIG. 2 below.

The fixup source file 33 contains directives (i.e., instructions) for modifying the size of the memory segments defined in the source file 31 for the program file 30. The assembler program module 37 is used to convert program files (i.e., source code) into object code so that they may later be transformed into an executable program file by the linker program module 39. The library program module 35 is used to convert object code into one or more libraries (i.e., ".LIB" files) that may later be linked with other object code by the linker program module 39. It will be understood by those skilled in the art that libraries are groups of programs which may be combined with other programs. It will be appreciated that the functions of the library program module 35, the assembler program module 37, and the linker program module 39 may be performed by a single program module such as the MICROSOFT MICRO ASSEMBLER ("MASM") marketed by MICROSOFT CORPORATION of Redmond, Wash. The functionality of the library program module 35, the assembler program module 37, and the linker program module 39 will be described in greater detail with respect to FIG. 3 below.

The mass storage device 14 is connected to the CPU 4 through a mass storage controller (not shown) connected to the bus 13. The mass storage device 14 and its associated computer-readable media, provide non-volatile storage for the computer system 2. Although the description of computer-readable media contained herein refers to a mass storage device, such as a hard disk or CD-ROM drive, it should be appreciated by those skilled in the art that computer-readable media can be any available media that can be accessed by the computer system 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the computer system 2 may operate in a networked environment using logical connections to remote computers through the network 18. The computer system 2 may connect to the network 18 through a network interface unit 20 connected to the bus 13. It should be appreciated that the network interface unit 20 may also be utilized to connect to other types of networks and remote computer systems. The computer system 2 may also include an input/output controller 22 for receiving and processing input from a number of devices, including a keyboard, mouse, or electronic stylus (not shown in FIG. 1). Similarly, an input/output controller 22 may provide output to a display screen, a printer, or other type of output device.

Figure 2:
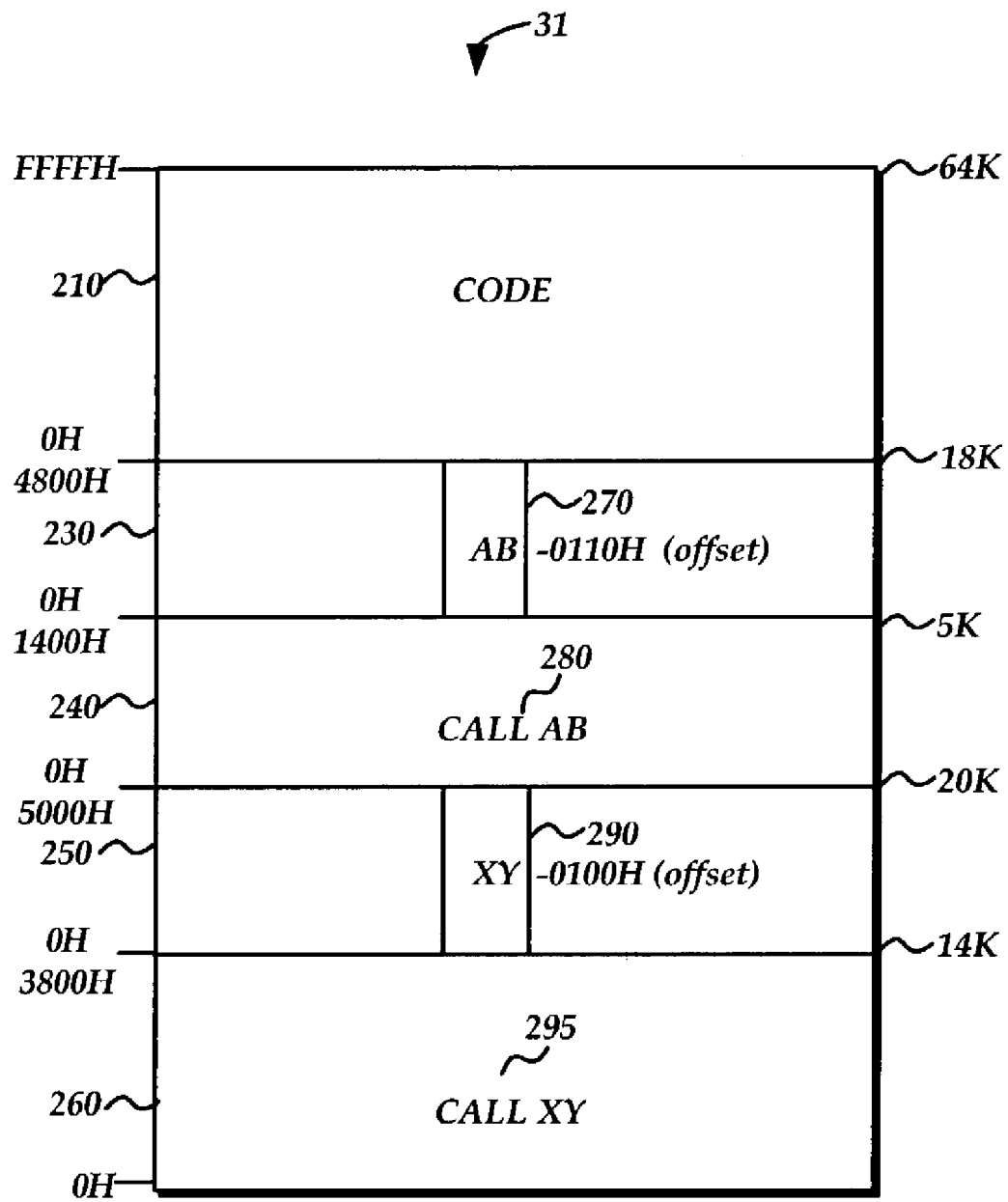
FIG. 2 illustrates a block diagram showing a layout of the source file in the computer system of FIG. 1 according to an embodiment of the invention.

FIG. 2 is a block diagram showing the layout of the segments defined by the source file 31 for the program file 30 described in FIG. 1 above according to an embodiment of the invention. It will be understood by those skilled in the art that source code (such as that found in the program file 30) may be put together according to functionality and executed in segments. Each segment has a maximum size of sixty-four kilobytes (64K). Thus, when a program is compiled or assembled, the source code is split into segments of up to 64K as defined by the source file 31. It will be appreciated that the code in each segment may represent a different function of the program.

As shown in FIG. 2, the program code is divided into memory segments 210-260 of various sizes from 5 kilobytes to 64 kilobytes which is the maximum size allowable. Each segment 210-260 has a memory location corresponding to a memory address in the RAM 8. The segments contain functions describing operations taking place in the program code.

It will be understood by those skilled in the art that segments are identified by a two-part number comprised of a segment address and an offset address. The segment address and the offset address are combined to form to an absolute address in RAM. For example, function AB 270 in the segment 230 is located at segment address 4800h at offset 0110h. Thus, the segment address for the function is identified as 4800h:0110h. Function AB 270 is "called" by the instruction CALL AB 280 located in the segment 240.

In assembly language, the CALL instruction is an instruction to jump from one memory address to another memory address. When a CALL is executed by a program the CALL instruction stores the segment of the new (i.e., called location) as well as the memory address of the location just following the CALL instruction itself in a memory location in the processor called a stack. Those skilled in the art will appreciate that there are two types of CALL instructions, near and far. Near CALL instructions are calls to functions within the same segment as the CALL instruction while far CALL instructions are calls to functions in a different segment than the CALL instruction. A called function is defined as either a near function or a far function in the program code of a segment.

When a CALL is executed, segments are loaded into processor registers, transferred to the stack via a PUSH instruction, and transferred from the stack via a POP instruction. It will be appreciated that segments are "POPped" from the stack in the opposite order they were "PUSHed" on the stack. Once a POP instruction is executed, control of the program is returned to the segment issuing the CALL instruction (i.e., where the program left off) via the RET instruction. The segment address portion of the segment is stored in a code segment (CS) register while the offset address portion is stored in an instruction pointer (IP) register. In a near CALL, the contents of the IP register are placed on the stack, while in a far CALL, the contents of first the CS register and then the IP register are placed on the stack. For example, in the FIG. 2, the instruction CALL XY 295 in the segment 260 would be properly defined as a far CALL to reach the function XY 290 in the segment 250 and would include the segment and offset portions of the address of the segment 250 (i.e., 5000h:0100h).

Figure 3:
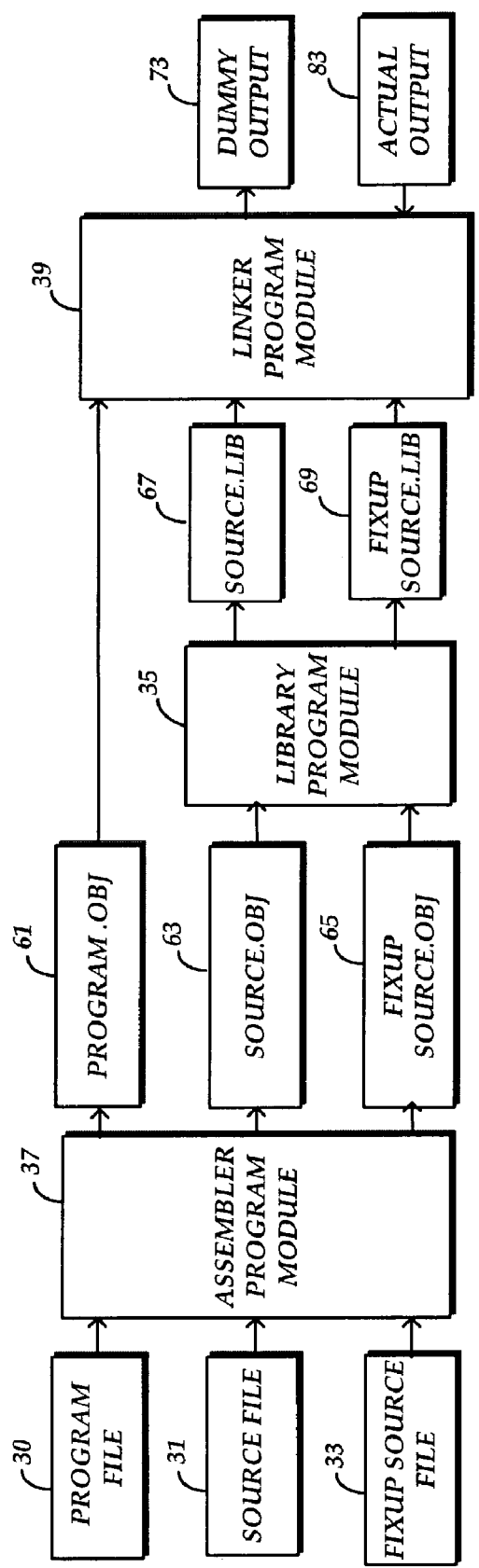
FIG. 3 illustrates a block diagram showing the linking of the program file into output files by the linker program module in the computer system of FIG. 1 according to an embodiment of the invention.

FIG. 3 illustrates a block diagram showing the transformation of the program file 30 into output files by the linker program module 39 in the computer system of FIG. 1 according to an embodiment of the invention. As shown in FIG. 3, the program file 30, the source file 31, and the fixup source file 33 are input into the assembler program module 37 and converted into object files program.obj 61, source.obj 63, and fixup source.obj 65. The source file 31 contains program code for defining segments in the program file 30. The fixup source file 33 contains program code for expanding the segments defined by the source file 31 to a predetermined size. As briefly discussed above, the maximum size for each segment is 64 kilobytes. The fixup source file 33 may define the segments to be a size equal to the maximum size or approximately equal to the maximum size (i.e., less than the maximum size).

The library program module receives the source and fixup source object files 63 and 65, and generates library files source.lib 67 and fixup source.lib 69 to be input into the linker program module 39. The linker program module 39 links the program.obj 61 with the fixup source.lib 69 to generate dummy output file 73. During the generation of the dummy output file 73, the linker program module 39 determines the validity of any inter-segment function calls. The linker program module 39 also links the program.obj 61 with the source.lib 67 to generate actual output file 83. As will be described in greater detail with respect to FIG. 5 below, the actual output file 83 is only generated by the linker program module 39 if there are no invalid inter-segment function calls in the generation of the dummy output file 73.

Figure 4:
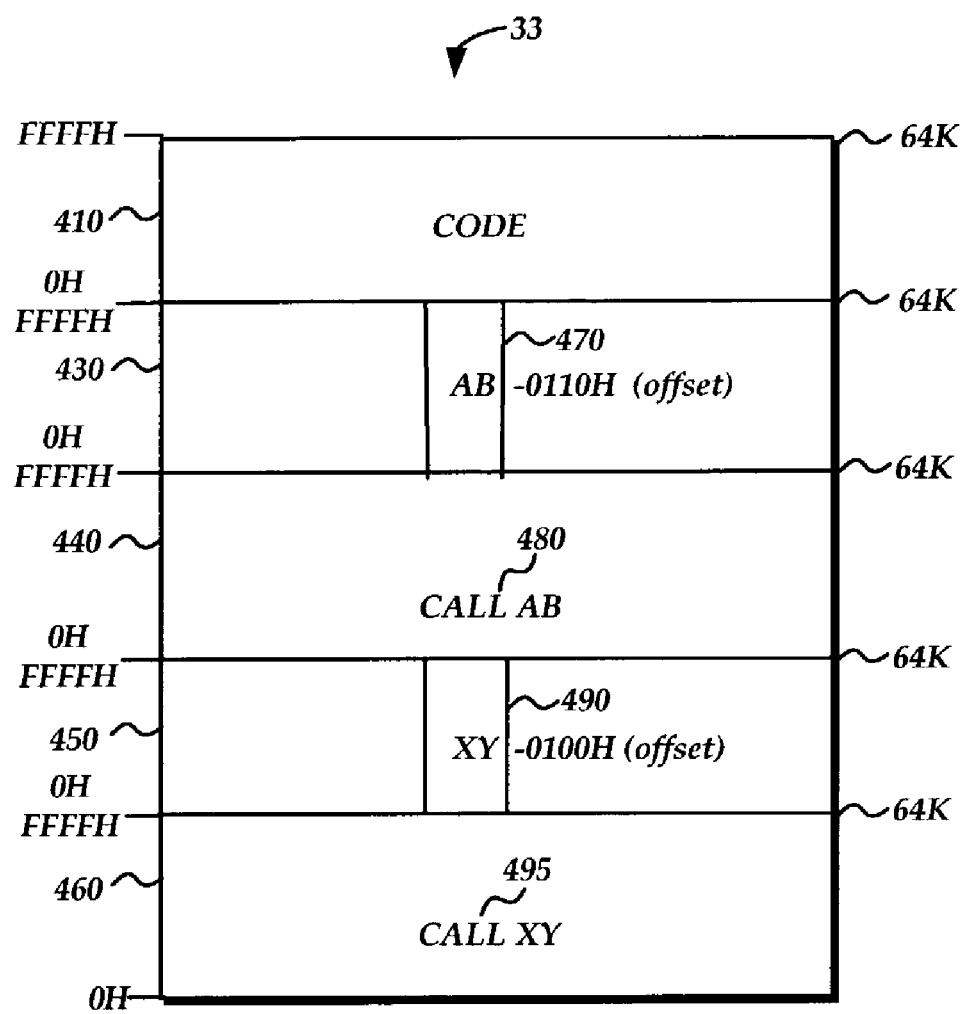
FIG. 4 illustrates a block diagram showing a layout of the fixup source file in the computer system of FIG. 1 according to an embodiment of the invention.

FIG. 4 is a block diagram showing the layout of the segments defined by the fixup source file 33 for the program file 30 described in FIG. 1 above according to an embodiment of the invention. The layout of the fixup source file 33 is similar to the layout of the source file 31 except that each of the segments 410-460 have been expanded by instructions in the library file 35. It will be appreciated by those skilled in the art that the fixup source file may define a common directive to size each segment in the dummy output file 73 at 64 kilobytes.

Figure 5:
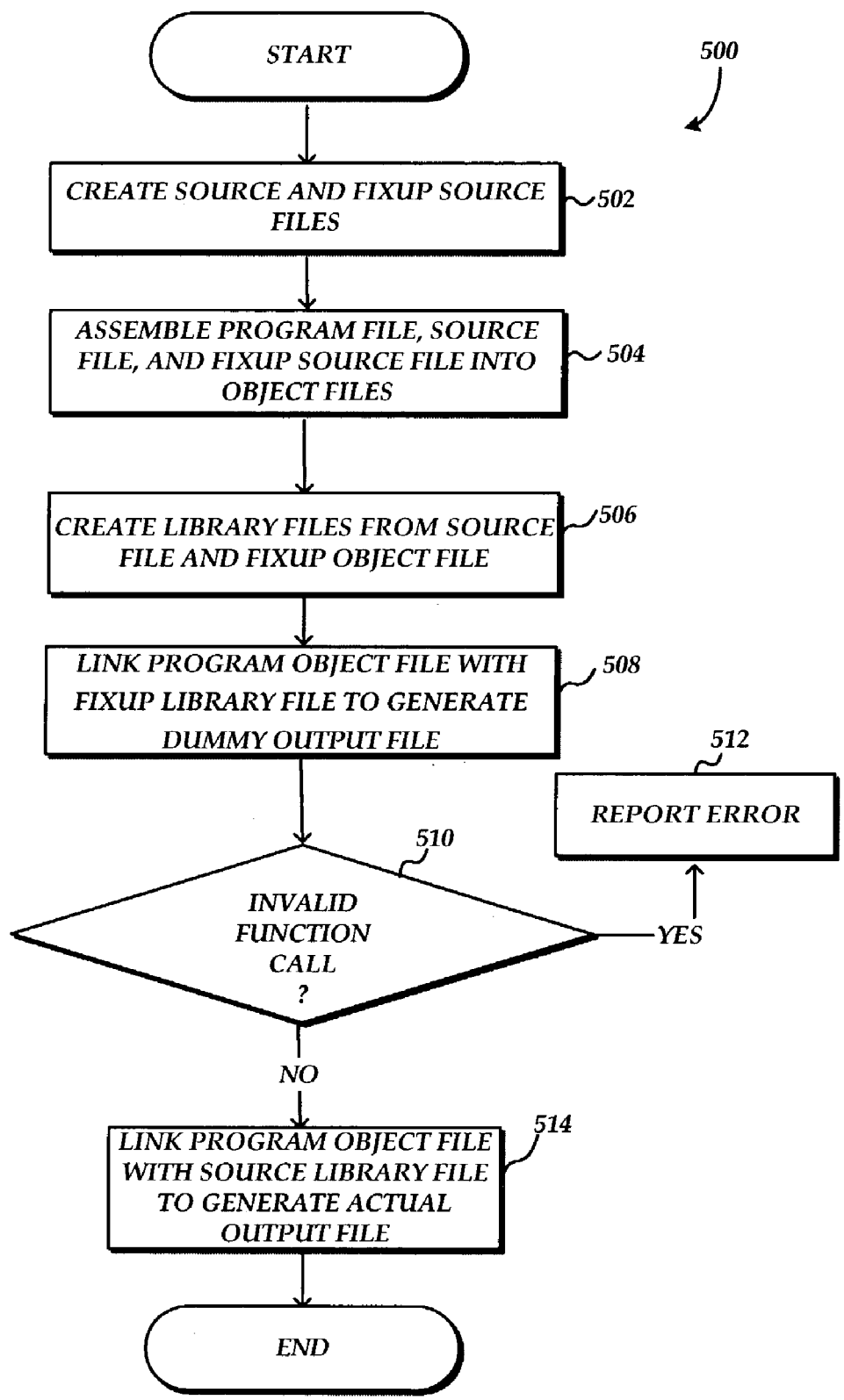
FIG. 5 illustrates an operational flow for detecting invalid function calls in the program file stored in the computer system of FIG. 1 according to an embodiment of the invention.

FIG. 5 shows illustrative logical operations performed by the application program 29, the assembler program module 37, the library program module 35, and the linker program module 39 for detecting invalid function calls in the program file 30 stored in the computer system of FIG. 1 according to an embodiment of the invention. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Turning now to FIG. 5, the logical operations 500 begin at operation 502 where the source file 31 and the fixup source file 33 are created in the application program 29. As discussed above, the source file 31 divides the code in the program file 30 into segments 210-260 which are sized between 5 kilobytes and 64 kilobytes as shown in FIG. 2. Also as discussed above, the fixup source file 33 contains instructions for expanding each of the segments in the program file 30 to 64 kilobytes. After the source files 31 and 33 are created at operation 502, the logical operations 500 continue at operation 504 where the assembler program module 37 assembles the program file 30, the source file 31, and the fixup source file 33 into object files. As shown in FIG. 3, the assembler program module 37 passes the source and fixup object files 63 and 65 to the library program module 35 and passes the program object file 61 to the linker program module 39.

The logical operations 500 continue at operation 506 where the library program module 35 creates the library files source.lib 67 and fixup source.lib 69 from the object files source.obj 63 and fixup source.obj 65. The logical operations 500 continue at operation 508 where the linker program module 39 links the program.obj 61 with the fixup source.lib 69 to generate the dummy output file 73. At operation 510 the linker program module 39 checks the segments defined in the fixup source file 33 (represented in the fixup source.lib 69) and determines whether there are any invalid inter-segment function calls. That is, the linker program module 39 determines whether a near function in one segment is defined as calling a function in another segment. If the linker program module 39 determines that there are invalid inter-segment function calls, the logical operations 500 continue to operation 512 where the linker program module 39 generates a fixup overflow condition error and stops generating the dummy output file 73. If, at operation 510, the linker program module 39 determines that there are no invalid inter-segment function calls, the linker program module 39 generates the actual output file 83 by linking the source.lib 67 with the program.obj 61 as shown in FIG. 3.

For example, in the layout of the fixup source file 33 shown in FIG. 4, each of the segments 410-460 have been expanded to 64 kilobytes. The calling function CALL XY 495 is in the segment 460 which has a size of 64 kilobytes while the called function XY 490 is in the segment 450 which also has a size of 64 kilobytes. If the function XY 490 is defined as a near function in the layout of the dummy output file 73 shown in FIG. 4, then the link program module 39 will generate a fixup overflow condition error since the calling function is making an improper far call to a function of 64 kilobtyes.

It will be appreciated that the embodiments of the invention described above enable the detection of invalid function calls in program code contained in segments which are less than 64 kilobytes in size. Previously, invalid inter-segment or far calls made to functions contained in segments less than but approximately equal to 64 kilobytes in size would result in the generation of an executable program file. Embodiments of the invention provide a linker program module which generates two builds of the program code. One build maintains the segments at their original size. A second or dummy build is also created which when linked with a library file, expands the segments to approximately their maximum size. With the segments expanded to approximately 64 kilobytes in the dummy build, the linker program module is able to detect invalid function calls.

Although the invention has been described in language specific to computer structural features, methodological acts and by computer readable media, it is to be understood that the invention defined in the appended claims is not necessarily limited to the specific-structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

I claim:

1. A method of detecting invalid function calls in a program file, the program file including code for making function calls to a plurality of functions defined in the program file, the method comprising:

creating a source file, the source file defining a plurality of memory segments in the program file, wherein each memory segment in the plurality of memory segments is defined to contain at least one of the functions defined in the program file;

creating a fixup source file, the fixup source file defining the plurality of memory segments defined in the source file to be a predetermined size;

assembling the program file, the source file, and the fixup source file to create a program object, a source object, and a fixup object;

creating a source library and a fixup library from the source object and the fixup object;

linking the program object with the fixup library to generate a dummy output file;

during the generation of the dummy output file, determining whether an invalid function call is made between the plurality of memory segments defined in the fixup library; and if it is determined that an invalid function call is made between the plurality of memory segments defined in the fixup library, then reporting an error in the dummy output file.

2. The method of claim 1, further comprising:

if it is determined that no invalid function calls are made between the plurality of memory segments during the generation of the dummy output file, then ignoring the dummy output file; and linking the program file with the source library to generate an actual output file.

3. The method of claim 1, wherein determining whether an invalid function call is made between the plurality of memory segments during the generation of the dummy output file comprises determining whether a calling function in the plurality of memory segments defined in the fixup library is making a near call to the at least one of the functions.

4. The method of claim 3, wherein determining whether a calling function in the plurality of memory segments defined in the fixup library is making a near call to the at least one of the functions comprises determining whether the at least one of the functions in the plurality of memory segments is defined as a near function.

5. The method of claim 3, wherein in linking the program object with the fixup library, the fixup library issues a directive to the program object in which the size of each memory segment in the plurality of memory segments is increased to the predetermined size.

6. The method of claim 5, wherein the predetermined size is a maximum size of the plurality of memory segments defined in the fixup source file.

7. The method of claim 5, wherein the predetermined size is less than a maximum size of the plurality of memory segments defined in the fixup source file.

8. The method of claim 6, wherein reporting an error comprises reporting a fixup overflow condition in the dummy output file.

9. The method of claim 8, wherein the program file comprises a BIOS code for the computer system.

10. A computer-readable medium comprising computer-executable instructions which, when executed by a computer, cause the computer to perform the method of claim 1.

11. A computer-controlled apparatus capable of performing the method of claim 1.

12. A system for detecting invalid function calls in a program file, the program file including code for making function calls to a plurality of functions defined in the program file, the system comprising:

an application program module for:

creating a source file, the source file defining a plurality of memory segments in the program file, wherein each memory segment in the plurality of memory segments is defined to contain at least one of the functions defined in the program file; and creating a fixup source file, the fixup source file defining the plurality of memory segments defined in the source file to be a predetermined size;

an assembler program module operative to assemble the program file, the source file, and the fixup source file into a program object, a source object, and a fixup source object;

a library program module operative to receive the source file and the fixup source file to generate a source library and a fixup source library; and a linker program module operative to:

link the program object and the fixup source library to generate a dummy output file;

during the generation of the dummy output file, to determine whether an invalid function call is made between the plurality of memory segments defined in the fixup library; and if it is determined that an invalid function call is being made, then report an error in the dummy output file.

13. The system of claim 12, wherein the linker module is further operative to:

if it is determined that no invalid function calls are made between the plurality of memory segments during the generation of the dummy output file, ignore the dummy output file; and linking the program object with the source library to generate an actual output file.

14. The system of claim 13, wherein the linker program module determines whether an invalid function call is made between the plurality of memory segments during the generation of the dummy output file by determining whether a calling function in the plurality of memory segments defined in the fixup library is making a near call to the at least one of the functions.

15. The system of claim 14, wherein the linker module determines whether a calling function in the plurality of memory segments defined in the fixup library is making a near call to the at least one of the functions by determining whether the at least one of the functions in the plurality of memory segments is defined as a near function.

16. The system of claim 15, wherein the linker module in reporting an error in the dummy output file reports a fixup overflow condition in the dummy output file.

17. The system of claim 16, wherein the predetermined size is a maximum size of the plurality of memory segments defined in the fixup source file.

18. The system of claim 16, wherein the predetermined size is less than a maximum size of the plurality of memory segments defined in the fixup source file.

19. The system of claim 17, wherein the program file includes code comprising a basic input/output system (BIOS).

* * * * *